United States Patent
Garbee

(10) Patent No.: US 11,982,587 B2
(45) Date of Patent: May 14, 2024

(54) TESTING SYSTEM FOR AN INTERMEDIATE STEERING SHAFT

(71) Applicant: GM GLOBAL TECHNOLOGY OPERATIONS LLC, Detroit, MI (US)

(72) Inventor: Robert Dickinson Garbee, Berkley, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/890,375

(22) Filed: Aug. 18, 2022

(65) Prior Publication Data

US 2024/0060853 A1 Feb. 22, 2024

(51) Int. Cl.
*G01M 17/06* (2006.01)
*G01M 13/025* (2019.01)
*G01P 15/00* (2006.01)

(52) U.S. Cl.
CPC ........... *G01M 13/025* (2013.01); *G01P 15/00* (2013.01)

(58) Field of Classification Search
CPC ...... G01M 13/025; G01M 17/06; G01P 15/00
See application file for complete search history.

(56) References Cited

U.S. PATENT DOCUMENTS

| | | | |
|---|---|---|---|
| 2009/0294206 A1* | 12/2009 | Oblizajek | B62D 5/0472 701/41 |
| 2011/0125450 A1* | 5/2011 | Lindenstruth | G01M 13/027 702/113 |
| 2017/0166242 A1* | 6/2017 | Konieczny | G06F 30/15 |
| 2018/0357338 A1* | 12/2018 | Picot | G06F 30/20 |
| 2020/0132568 A1* | 4/2020 | Miles | G01M 13/028 |
| 2021/0199539 A1* | 7/2021 | Matsumoto | G01M 17/007 |

OTHER PUBLICATIONS

GMW15599 Abstract—"Steering Column Intermediate Shaft Stick Slip Durability," (Sep. 2019, 4th Ed.) https://global.ihs.com/doc_detail.cfm?document_name=GMW15599&item_s_key=00505229.

* cited by examiner

*Primary Examiner* — Eric S. McCall

(57) ABSTRACT

A testing system for an intermediate steering shaft includes a steering input motor including a shaft. A first U-joint includes a first end connected to the shaft of the steering input motor. An intermediate steering shaft includes a first shaft coupled to a second end of the first U-joint, a slider connected to the first shaft, and a second shaft connected to the slider. A second U-joint includes a first end connected to the second shaft of intermediate steering shaft. A motor includes a shaft and is configured to simulate steering loads. An adapter is configured to connect a second end of the second U-joint to the shaft of the motor. The adapter is configured to cause eccentric rotation of the second shaft of the intermediate steering shaft.

20 Claims, 4 Drawing Sheets

TESTING SYSTEM FOR AN INTERMEDIATE STEERING SHAFT

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for measuring intermediate steering shaft component stick-slip clunk.

An operator of a vehicle uses a steering wheel to turn front wheels of a vehicle. Under certain circumstances such as in parking lots, components of a vehicle's steering system can cause binding, require increased effort, and/or make noises as the steering wheel is turned. The noises may be objectional to passengers of the vehicle.

SUMMARY

A testing system for an intermediate steering shaft includes a steering input motor including a shaft. A first U-joint includes a first end connected to the shaft of the steering input motor. An intermediate steering shaft includes a first shaft coupled to a second end of the first U-joint, a slider connected to the first shaft, and a second shaft connected to the slider. A second U-joint includes a first end connected to the second shaft of intermediate steering shaft. A motor includes a shaft and is configured to simulate steering loads. An adapter is configured to connect a second end of the second U-joint to the shaft of the motor. The adapter is configured to cause eccentric rotation of the second shaft of the intermediate steering shaft.

In other features, the first U-joint, the second U-joint and the intermediate steering shaft are arranged at angles corresponding to a vehicle orientation. The first U-joint and the second U-joint comprise double Cardan joints. An accelerometer is configured to measure acceleration of at least one of the shaft of the motor, the shaft of the steering input motor, the first shaft of the intermediate steering shaft, and the second shaft of the intermediate steering shaft. A controller is configured to control a torque applied by the motor during testing.

In other features, the controller is further configured to cause the steering input motor to rotate reciprocally at a handwheel speed through a predetermined angle from one or more starting angles; and record acceleration during rotation. The controller compares the measured acceleration to a predetermined threshold and selectively identifies a fault based on the comparison.

In other features, the adapter includes a bore that extends axially and that is offset from a central axis of the adapter by a predetermined offset. The predetermined offset is in a predetermined range from 2 mm to 4 mm. The eccentric rotation causes the first shaft and the second shaft of the intermediate steering shaft to reciprocate relative to the slider.

A method for testing system an intermediate steering shaft includes connecting a first end of a first U-joint to a shaft of a steering input motor; connecting a first shaft of an intermediate steering shaft to a second end of the first U-joint, wherein the intermediate steering shaft includes a slider connected to the first shaft and a second shaft connected to the slider; connecting a first end of a second U-joint to the second shaft of intermediate steering shaft; and connecting an adapter between a second end of the second U-joint and a shaft of a motor configured to simulate steering loads. The adapter is configured to cause eccentric rotation of the second shaft of the intermediate steering shaft as the shaft of the steering input motor is rotated.

In other features, the method includes arranging the first U-joint, the second U-joint and the intermediate steering shaft at angles corresponding to a vehicle orientation. The first U-joint and the second U-joint comprise double Cardan joints. The method includes measuring acceleration of at least one of the shaft of the motor, the shaft of the steering input motor, the first shaft of the intermediate steering shaft, and the second shaft of the intermediate steering shaft.

In other features, the method includes controlling a torque applied by the motor to simulate steering load; causing the steering input motor to rotate reciprocally at a handwheel speed through a predetermined angle starting from one or more starting angles; and recording acceleration during rotation.

In other features, the method includes comparing the measured acceleration to a predetermined threshold and selectively identifying a fault based on the comparison. The adapter includes a bore that extends axially and that is offset from a central axis of the adapter by a predetermined offset. The predetermined offset is in a predetermined range from 2 mm to 4 mm. The eccentric rotation causes the first shaft and the second shaft of the intermediate steering shaft to reciprocate relative to the slider.

A testing system for an intermediate steering shaft includes a steering input motor including a shaft. A first U-joint includes a first end connected to the shaft of the steering input motor. An intermediate steering shaft includes a first shaft coupled to a second end of the first U-joint, a slider connected to the first shaft, and a second shaft connected to the slider. A second U-joint includes a first end connected to the second shaft of intermediate steering shaft. A motor includes a shaft and configured to simulate steering loads. An adapter is configured to connect a second end of the second U-joint to the shaft of the motor. The adapter is configured to cause eccentric rotation of the second shaft of the intermediate steering shaft. The first U-joint, the second U-joint and the intermediate steering shaft are arranged at angles corresponding to a vehicle orientation. The first U-joint and the second U-joint comprise double Cardan joints. An accelerometer is configured to measure acceleration of at least one of the shaft of the motor, the shaft of the steering input motor, the first shaft of the intermediate steering shaft, and the second shaft of the intermediate steering shaft.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Component-level stick-slip clunk tests have been used to identify intermediate steering shafts (I-shafts) of steering systems that are likely to be noisy. For example, stick-slip clunk may occur during parking maneuvers as the steering wheel is rotated in opposite directions while the vehicle speed is relatively low (and steering effort is high), and the vehicle may be driven in forward and/or reverse directions.

In some stick-slip clunk tests, the I-shaft is evaluated by holding the I-shaft straight, applying a net torque to the I-shaft, and stroking a slider of the I-shaft. In these tests, the I-shaft is not oriented at the correct vehicle angles and does not rotate. This type of test has been ineffective at identifying some modes of stick-slip clunk.

Systems and methods according to the present disclosure measure I-shaft stick-slip clunk on a test bench. The I-shaft is arranged between a steering motor and a motor that simulates loading of the steering system (such as a torque reaction motor). The I-shaft is arranged at the vehicle angle and length for a given vehicle to reproduce vehicle geometry and physics. A net torque is applied between the steering motor and the torque reaction motor as the I-shaft is rotated.

In some examples, an offset adapter located at a pinion side of the shaft creates eccentricity (or eccentric rotation) to cause stroking of a telescoping slider of the I-shaft during rotation. This movement mimics the geometry and physics of conditions that are likely to cause stick-slip clunk in vehicles (such as parking lot maneuvers). The slider strokes during normal vehicle operation due to deformation of body mount bushings and steering gear bushings. The offset adapter replicates the stroking motion without requiring another actuator.

An accelerometer arranged on the I-shaft records changes in acceleration corresponding to clicks and bumps created in the I-shaft during rotation. The clicks and bumps correlate well to stick-slip clunk that is heard when the I-shaft is installed in a vehicle. As a result, the testing systems and methods according to the present disclosure improve identification of unacceptable I-shaft stick-slip clunk.

Figure 1:
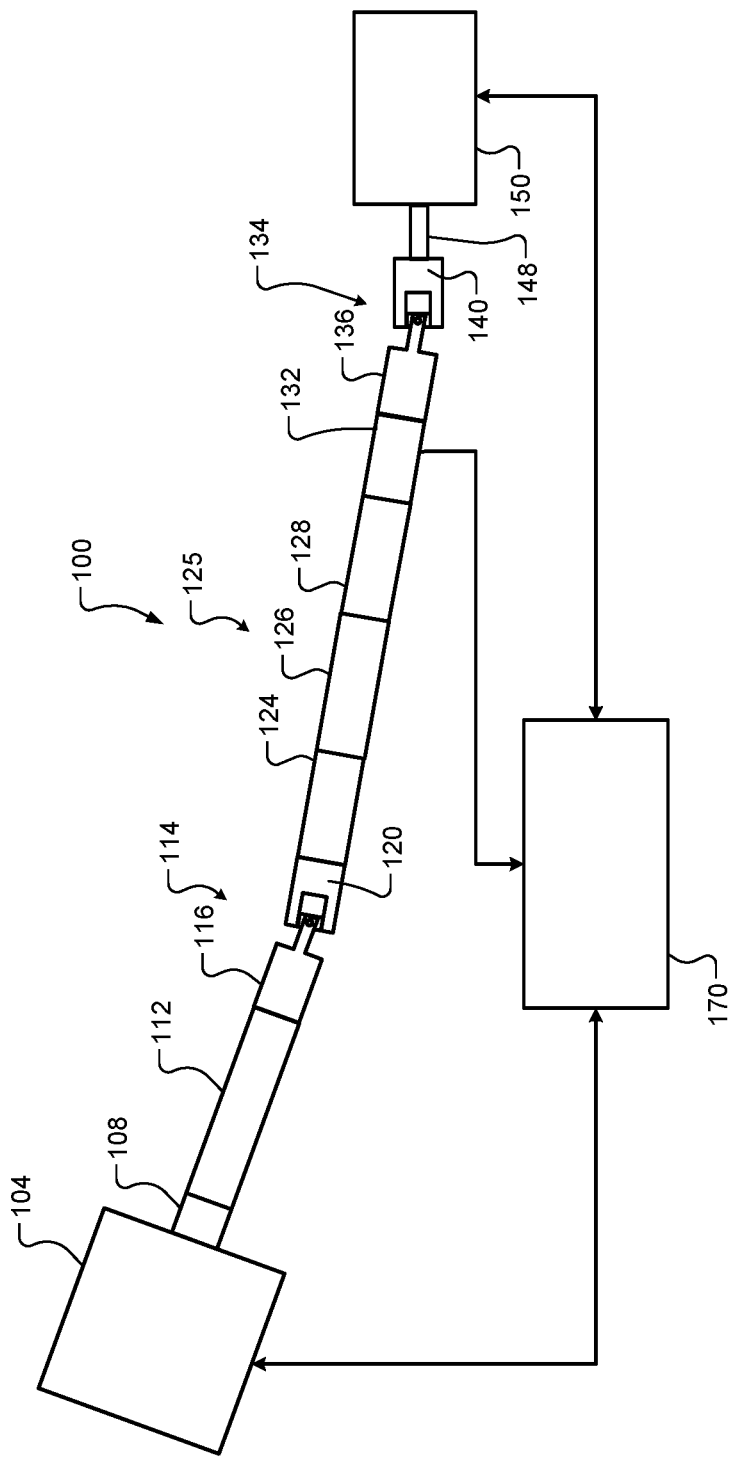
FIG. 1 is a functional block diagram of an example of a test bench for testing an intermediate steering shaft (I-shaft) of a steering system of a vehicle for stick-slip clunk according to the present disclosure.

Referring now to FIG. 1, a testing system 100 for an intermediate steering shaft (I-shaft) for a steering system of a vehicle is shown. The testing system 100 includes a first motor 104 such as a torque reaction motor that simulates a load on a steering system of a vehicle when the steering wheel is rotated. In other words, the first motor 104 rotates in the same to the direction that the steering wheel is turning to provide torque in the opposite direction and simulate loading of the steering during operation.

A shaft 108 of the first motor 104 is connected by an adapter 112 to a second end 116 of a U-joint 114. A first end 120 of the U-joint 114 is connected to an upper I-shaft 124 of an I-shaft 125. A lower shaft 128 of the I-shaft 125 is connected by a slider 126 to the upper I-shaft 124 and to a shaft 136 of a U-joint 134. The slider 126 allows the upper I-shaft 124 of the I-shaft 125 to telescope relative to the lower shaft 128 of the I-shaft 125. In some examples, the U-joints 114 and 134 include double Cardan joints. In some examples, the u-joints 114 and 134, the upper I-shaft 124, the lower shaft 128, and the slider 126 are all part of the I-shaft assembly under test.

An accelerometer 132 is connected around the shaft 136 of the U-joint 134 (and/or other rotating components). In some examples, the accelerometer 132 is glued or fastened to the outer surface of the shaft 136. One or more additional accelerometers 132 may be used in other locations if desired. A shaft 140 of the U-joint 134 is connected to a shaft 148 of a steering input motor 150.

A controller 170 is configured to control the first motor 104 and the steering input motor 150. The controller 170 is configured to control the first motor 104 to simulate steering loading. The controller 170 is configured to control the steering input motor 150 to rotate at a representative handwheel speed. The controller 170 also receives the output of the accelerometer 132 (and other accelerometers if used).

Figure 2:
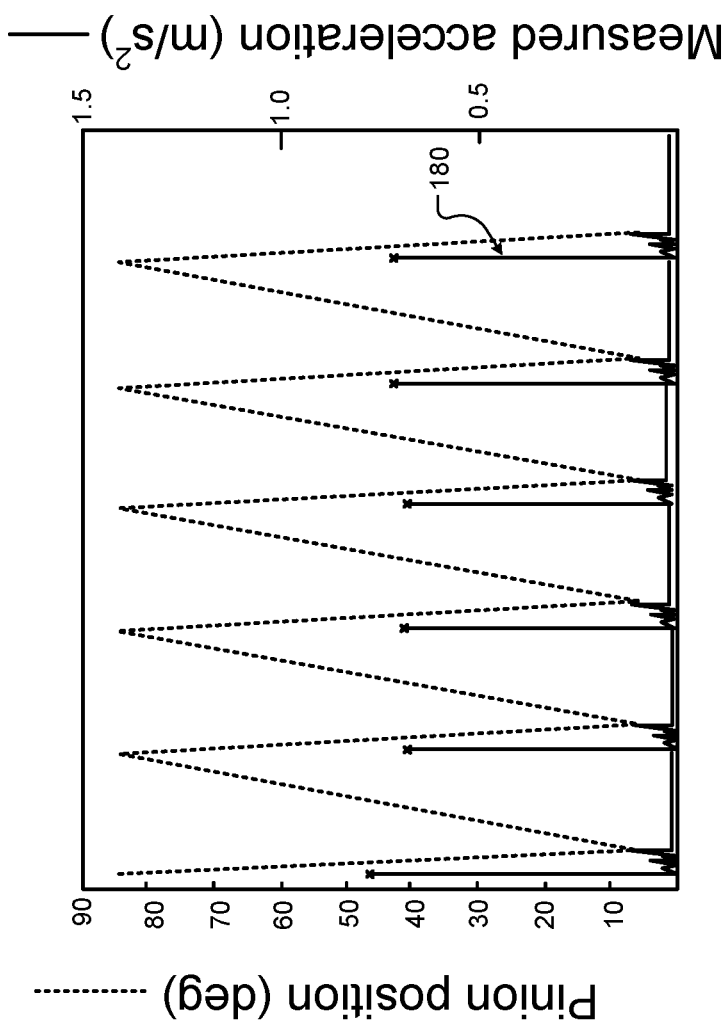
FIG. 2 is a graph illustrating pinion position as a function of time.

Referring now to FIG. 2, a graph shows pinion position as a function of time while the steering wheel motor rotates at a representative handwheel speed. As can be seen, the test system measures acceleration spikes 180 during testing. The acceleration spikes correlate well with stick-slip clunk.

Figure 3B:
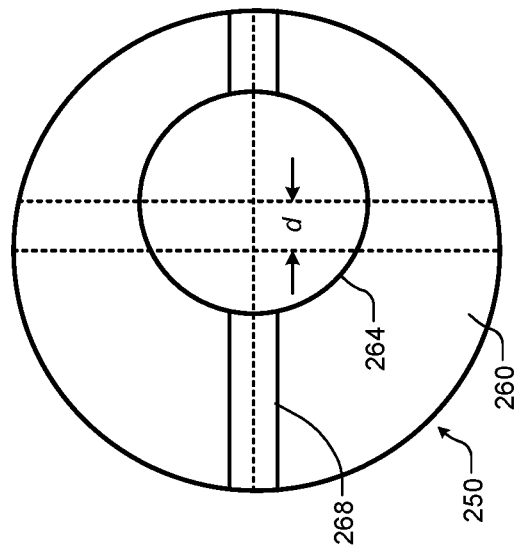
FIG. 3B is a graph illustrating one end of an offset adapter according to the present disclosure.
Figure 3A:
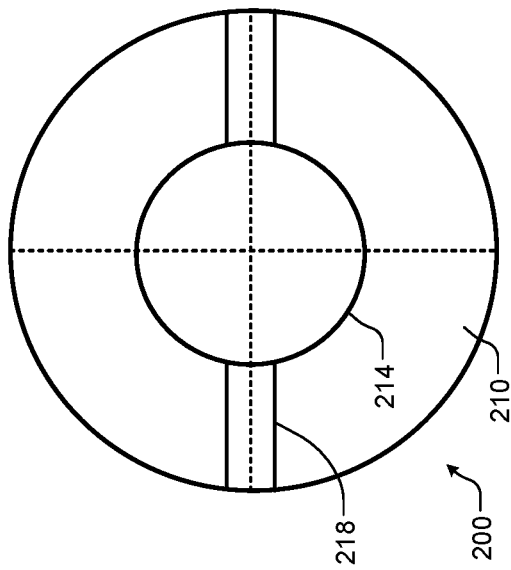
FIG. 3A is a graph illustrating one end of a non-offset adapter.

Referring now to FIG. 3A, an adapter 200 includes a cylindrical body 210 with a bore 214 that is coaxial with the cylindrical body 210. A slot 218 may be formed on opposite sides of the cylindrical body 210 between the bore 214 and a radially outer surface of the cylindrical body 210 along a portion of an axial length of the cylindrical body 210. In some examples, the slot 218 is used to fix rotation of the adapter 200 relative to another shaft.

Referring now to FIG. 3B, an adapter 250 includes a cylindrical body 260 with a bore 264 that is offset from an axis of the cylindrical body 260 by a predetermined offset distance d. In some examples, 1 mm<d<5 mm. In some examples, 2 mm<d<4 mm (e.g., d=3 mm). The offset distance determines how much slider stroking is experienced during a revolution—increasing the offset increases the distance of stroking.

A slot 268 may be formed on opposite sides of the cylindrical body 260 between the bore 264 and a radially outer surface of the cylindrical body 260 along a portion of an axial length of the cylindrical body 260. In some examples, the slot 268 is used to fix rotation of the adapter 250 relative to another shaft.

Referring back to FIG. 1, the testing system 100 according to the present disclosure uses the torque reaction motor, the steering input motor and the offset adapter to represent the physics of the i-shaft when installed in the vehicle more accurately. In particular, the testing system 100 creates a bending condition that I-shafts with double cardan joints experience when loaded. The bending condition can cause stick-slip clunk, and existing testing systems do not create the condition.

The test system also mimics vehicle conditions by loading the i-shaft with a static net torque that matches the torque in the i-shaft during parking lot maneuvers and rotates the shaft back and forth. This procedure, loading and rotating back and forth, is the most consistent procedure for creating the stick-slip clunk noise in the vehicle.

In addition, current tests measure stick-slip clunk effects as sudden changes in the measured sliding force, rather than directly measuring the bumps that cause noise using accelerometers. Accelerometers placed directly on the I-shaft are the most accurate way to measure the noise-causing events, and directly correlate to noises heard by the occupants of the vehicle. In some examples, the acceleration data is compared to one or more predetermined acceleration thresholds. The locations and magnitudes of the clunks match the clunks observed in vehicle directly.

Figure 4:
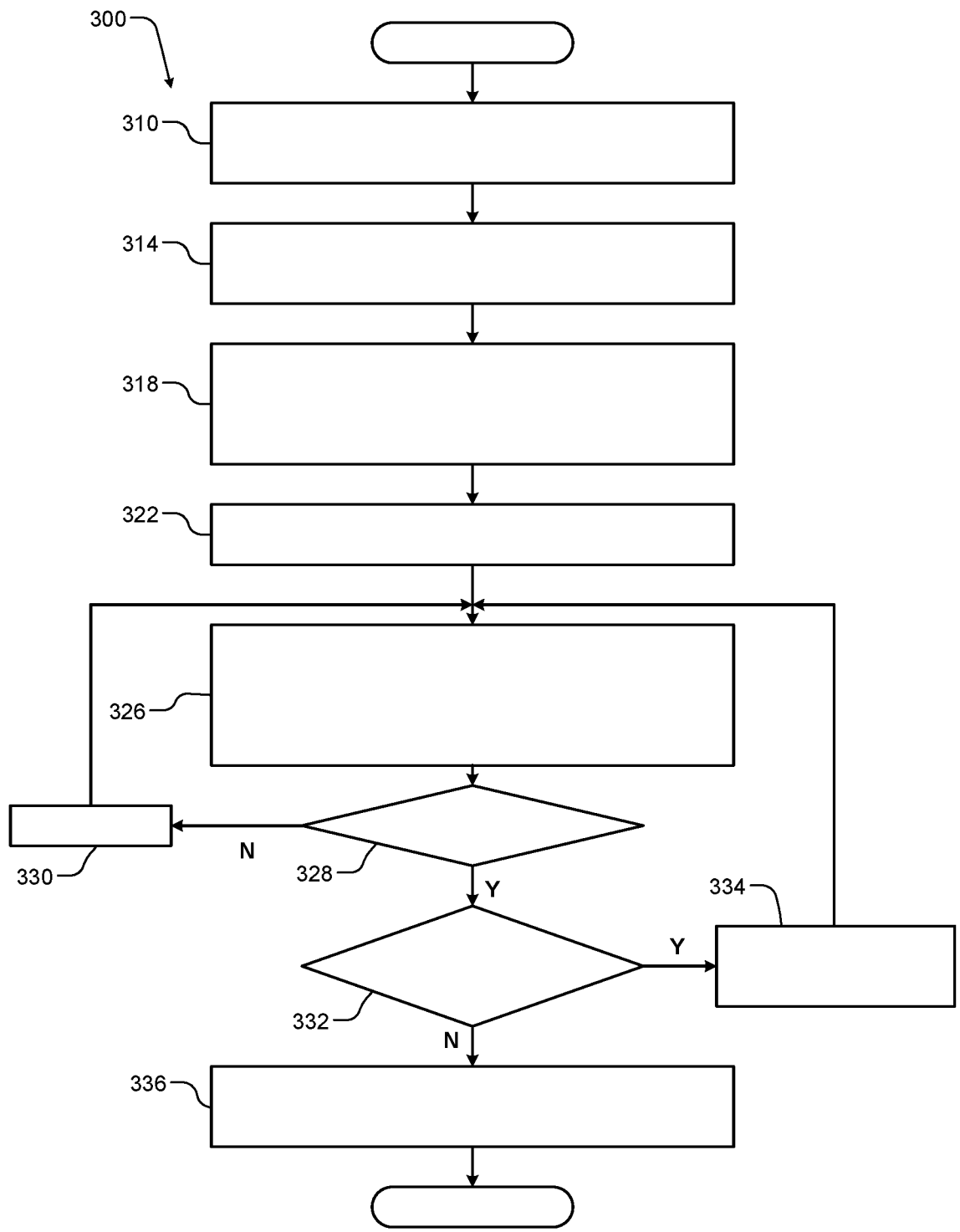
FIG. 4 is a flowchart of a method for measuring I-shaft stick-slip clunk on a test bench according to the present disclosure.

Referring now to FIG. 4, a method 300 for testing an I-shaft of a vehicle steering system on a test bench is shown. At 310, the test bench is set up with the I-shaft in vehicle coordinates and N is set equal to 1. At 314, accelerometers are installed on the I-shaft. At 318, the motor attached to offset adapter is used to load the I-shaft with representative torque opposing the direction of motion.

At 322, the starting angle is set to a first value. At 326, the motor attached to the column adapter is used to rotate the I-shaft 90 degrees (or one or more other predetermined angle range) at a representative handwheel speed starting from the starting angle while measuring acceleration. At 328, the method determines whether $N=TH_1$, where $TH_1$ is an integer greater than zero corresponds to the number of times that the test is performed for a particular starting angle. If 328 is false, the method continues at 330, sets $N=N+1$ and continues at 326.

If 328 is true, the method continues at 332 and determines whether testing will be performed at one or more other starting angles. If 332 is true, the method continues at 334, changes the stating angle, resets N to 1, and then continues at 326. When 332 is false, the I-shaft is evaluated based on measured acceleration during the test at 336. In some examples, the measured acceleration is compared to one or more acceleration thresholds or acceleration functions.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A testing system for an intermediate steering shaft, comprising:
    a steering input motor including a shaft;
    a first U-joint including a first end connected to the shaft of the steering input motor;
    an intermediate steering shaft including a first shaft coupled to a second end of the first U-joint, a slider connected to the first shaft, and a second shaft connected to the slider;
    a second U-joint including a first end connected to the second shaft of intermediate steering shaft;
    a simulation motor including a shaft and configured to simulate steering loads; and
    an adapter configured to connect a second end of the second U-joint to the shaft of the simulation motor, wherein the adapter is configured to cause eccentric rotation of the second shaft of the intermediate steering shaft.

2. The testing system of claim 1, wherein the first U-joint, the second U-joint and the intermediate steering shaft are arranged at angles corresponding to a vehicle orientation.

3. The testing system of claim 1, wherein the first U-joint and the second U-joint comprise double Cardan joints.

4. The testing system of claim 1, wherein the eccentric rotation causes the first shaft and the second shaft of the intermediate steering shaft to reciprocate relative to the slider.

5. The testing system of claim 1, wherein the adapter includes a bore that extends axially and that is offset from a central axis of the adapter by a predetermined offset.

6. The testing system of claim 5, wherein the predetermined offset is in a predetermined range from 2 mm to 4 mm.

7. The testing system of claim 1, further comprising an accelerometer configured to measure acceleration of at least one of the shaft of the simulation motor, the shaft of the steering input motor, the first shaft of the intermediate steering shaft, and the second shaft of the intermediate steering shaft.

8. The testing system of claim 7, further comprising a controller configured to control a torque applied by the simulation motor during testing.

9. The testing system of claim 8, wherein the controller is further configured to:
    cause the steering input motor to rotate reciprocally at a handwheel speed through a predetermined angle from one or more starting angles; and
    record acceleration during rotation.

10. The testing system of claim 9, wherein the controller is configured to perform a comparison of the measured acceleration to a predetermined threshold and selectively identify a fault based on the comparison.

11. A method for testing an intermediate steering shaft, comprising:
    connecting a first end of a first U-joint to a shaft of a steering input motor;
    connecting a first shaft of an intermediate steering shaft to a second end of the first U-joint, wherein the intermediate steering shaft includes a slider connected to the first shaft and a second shaft connected to the slider;
    connecting a first end of a second U-joint to the second shaft of intermediate steering shaft; and
    connecting an adapter between a second end of the second U-joint and a shaft of a simulation motor configured to simulate steering loads,
    wherein the adapter is configured to cause eccentric rotation of the second shaft of the intermediate steering shaft as the shaft of the steering input motor is rotated.

12. The method of claim 11, further comprising arranging the first U-joint, the second U-joint and the intermediate steering shaft at angles corresponding to a vehicle orientation.

13. The method of claim 11, wherein the first U-joint and the second U-joint comprise double Cardan joints.

14. The method of claim 11, wherein the eccentric rotation causes the first shaft and the second shaft of the intermediate steering shaft to reciprocate relative to the slider.

15. The method of claim 11, wherein the adapter includes a bore that extends axially and that is offset from a central axis of the adapter by a predetermined offset.

16. The method of claim 15, wherein the predetermined offset is in a predetermined range from 2 mm to 4 mm.

17. The method of claim 11, further comprising measuring acceleration of at least one of the shaft of the simulation motor, the shaft of the steering input motor, the first shaft of the intermediate steering shaft, and the second shaft of the intermediate steering shaft.

18. The method of claim 17, further comprising:
    controlling a torque applied by the simulation motor to simulate steering load;
    causing the steering input motor to rotate reciprocally at a handwheel speed through a predetermined angle starting from one or more starting angles; and
    recording acceleration during rotation.

19. The method of claim 18, further comprising performing a comparison of the measured acceleration to a predetermined threshold and selectively identifying a fault based on the comparison.

20. A testing system for an intermediate steering shaft, comprising:
- a steering input motor including a shaft;
- a first U-joint including a first end connected to the shaft of the steering input motor;
- an intermediate steering shaft including a first shaft coupled to a second end of the first U-joint, a slider connected to the first shaft, and a second shaft connected to the slider;
- a second U-joint including a first end connected to the second shaft of intermediate steering shaft;
- a motor including a shaft and configured to simulate steering loads;
- an adapter configured to connect a second end of the second U-joint to the shaft of the motor, wherein the adapter is configured to cause eccentric rotation of the second shaft of the intermediate steering shaft,
- wherein the first U-joint, the second U-joint and the intermediate steering shaft are arranged at angles corresponding to a vehicle orientation, and
- wherein the first U-joint and the second U-joint comprise double Cardan joints; and
- an accelerometer configured to measure acceleration of at least one of the shaft of the motor, the shaft of the steering input motor, the first shaft of the intermediate steering shaft, and the second shaft of the intermediate steering shaft.

* * * * *